Nov. 22, 1955  D. L. HENLEY  2,724,462
AUTOMATIC BRAKES FOR CONVEYOR BELTS
Filed Nov. 12, 1952  2 Sheets-Sheet 1

INVENTOR.
D. L. HENLEY
BY
F. Ledermann
ATTORNEY

Nov. 22, 1955 D. L. HENLEY 2,724,462
AUTOMATIC BRAKES FOR CONVEYOR BELTS
Filed Nov. 12, 1952 2 Sheets-Sheet 2
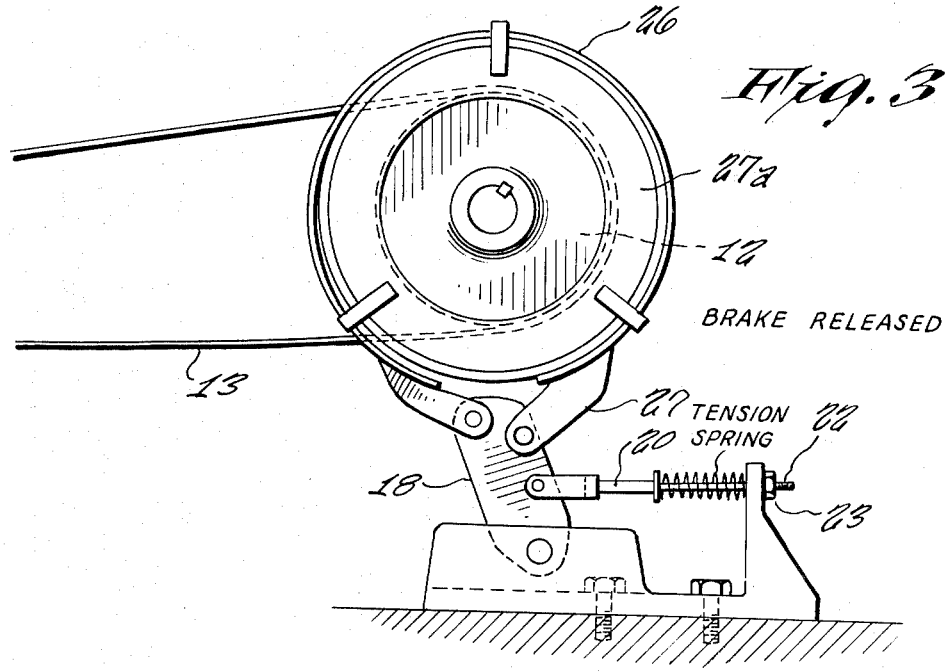
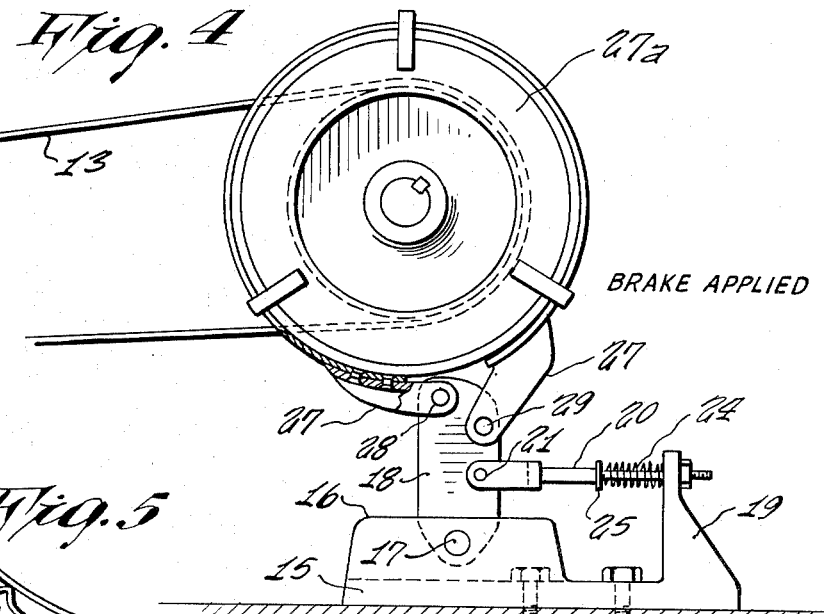
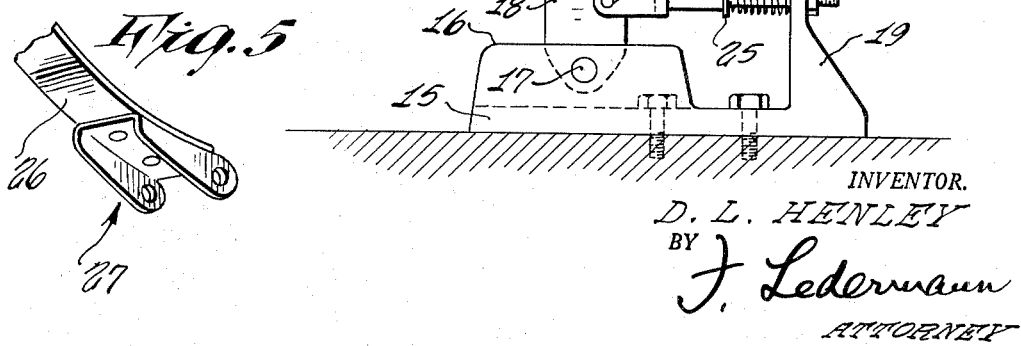
INVENTOR.
D. L. HENLEY
BY J. Ledermann
ATTORNEY

United States Patent Office 2,724,462
Patented Nov. 22, 1955

2,724,462
AUTOMATIC BRAKES FOR CONVEYOR BELTS
Dan L. Henley, Otsego, W. Va.

Application November 12, 1952, Serial No. 319,925

1 Claim. (Cl. 188—82.6)

This invention relates to brakes, and the main object is the provision of an automatic brake for any type of conveyor belt on an elevated incline or level. A particular application of the invention, merely by way of example, is in the case of a coal conveyor. The installed automatic brake permits free rotation of the belt pulley or drum while the conveyor moves in the desired direction, but if and whenever the conveyor comes to a stop, whether intentionally or due to a power failure, the brake automatically locks the drum against rotation in the reverse direction, which is obviously a most desirable feature.

The automatic brake of this invention is adjustable for various sizes of shafts and for various sizes of belts and conveyor loads. The brake is applied to the same shaft which carries the pulley or drum about which the conveyor belt is trained.

The above as well as additional and more specific objects will be clarified in the following description, wherein characters of reference refer to like-numbered parts in the accompanying drawings. It is to be noted that the drawings are intended solely for the purpose of illustration and that it is therefore neither desired nor intended to limit the invention necessarily to any or all of the exact details shown or described except insofar as they may be deemed essential to the invention.

Referring briefly to the drawings, Fig. 1 is a plan view of one end of a conveyor belt and the associated parts of the system, with the automatic brake of this invention applied thereto.

Fig. 3 is a side elevational view of Figs. 1 and 2, with parts omitted, showing the relative positions of the parts of the automatic brake while the conveyor belt is in normal or forward running position.

Fig. 4 is a view similar to Fig. 3, showing, however, the relative positions of the parts of the automatic brake in locking position to automatically stop the belt from reversing when the belt comes to a stop.

Fig. 5 is a perspective view of a detail, showing a means for attaching an end of a brake band to the rocker arm of the automatic brake.

Figure 1:
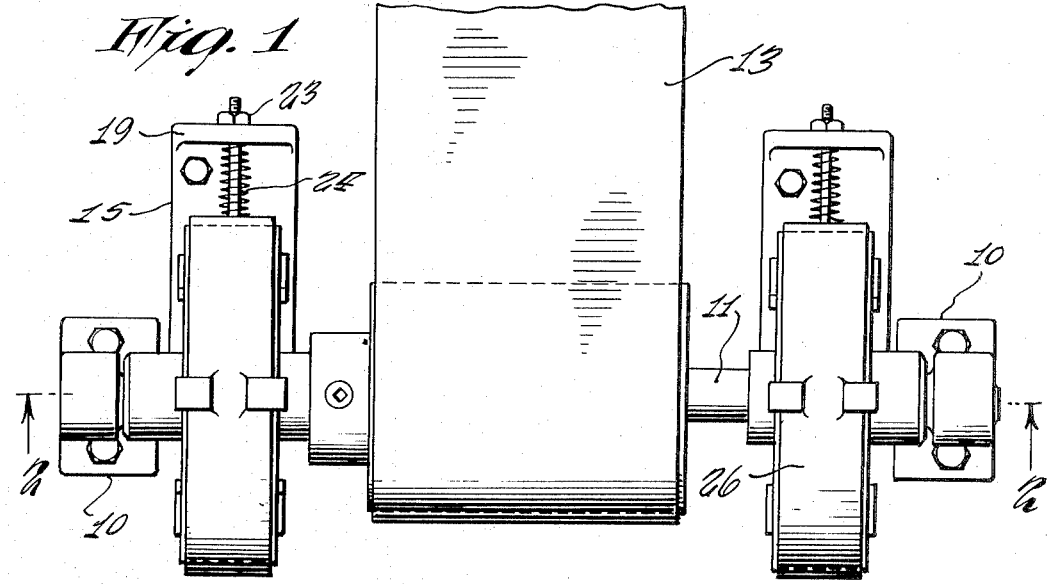
Figure 2:
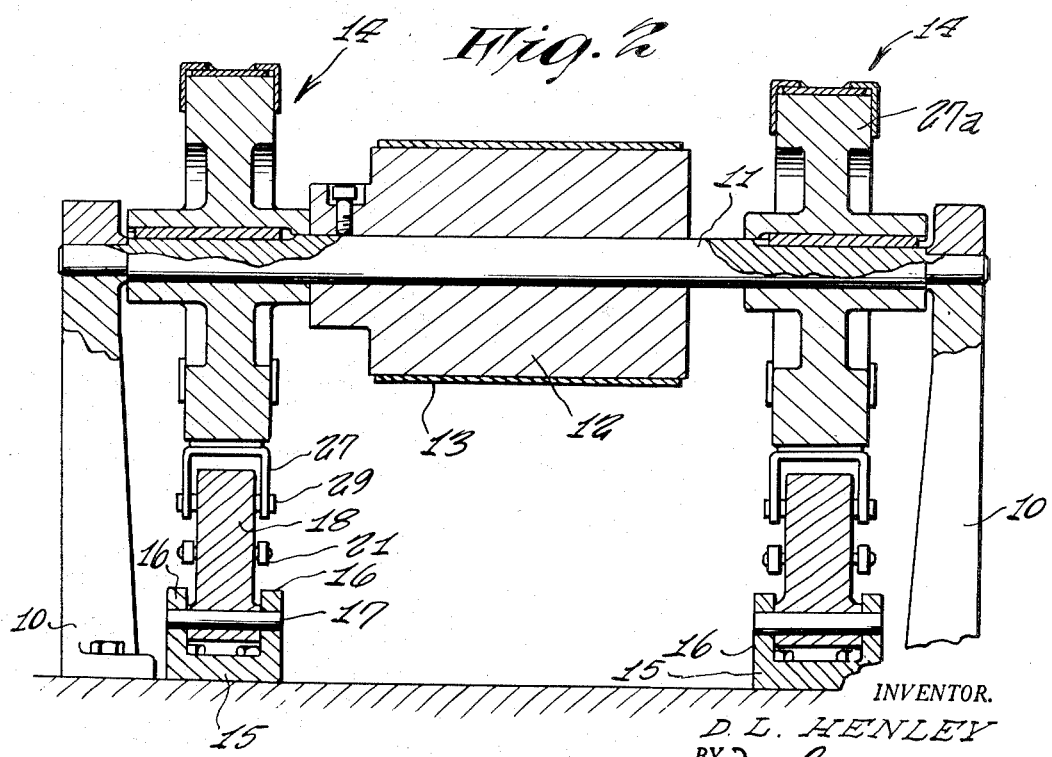
Fig. 2 is a sectional view taken on the line 2—2 of Fig. 1.

For the sake of simplicity, no brake lining has been shown in the drawings, but it is of course understood that, as a standard practice, brake bands are provided with a suitable lining.

Referring in detail to the drawings, the numerals indicate two similar bases or pedestals in which the ends of a shaft 11, carrying a belt drum 12 locked thereon, are rotatably supported. The conveyor belt 13 is trained about the drum 12 and adapted to rotate the latter and hence the shaft 11.

Positioned on each side of the drum 12, is the automatic braking mechanism 14. The latter comprises a base 15 anchored to the floor and having spaced upright flanges 16 in which a pivot pin 17 is supported. A rocker 18 is rotatably or pivotally supported at its lower end by the pin 17. The base 15 is elongated and at the end thereof opposite the flanges 16 an upright 19 is provided. A substantially horizontal rod 20 has one end passing through an opening in the upright 19 and the other end, which is forked, is pivotally attached at 21 to the rocker 18 approximately intermediate the height of the latter. The extremity 22 of the rod is threaded so that by means of a nut 23 thereon the rod 20 may be moved longitudinally with respect to the upright 19. A tension spring 24 on the rod between a collar 25 and the upright 19 tends to resist swinging of the rocker counter-clockwise (Figs. 3 and 4).

A brake band 26 is applied around the drum or pulley 27a, the latter being keyed to the shaft 11. By means of connecting members 27, one end of the brake band is pivotally attached at 28 to the upper end of the rocker 18 near the left-hand side of the latter, and the other end of the brake band is attached at 29 near the right-hand side of the rocker and at a point positioned intermediate the levels of the pivots 28 and 21.

It is apparent from a perusal of Figs. 3 and 4, that the brake is released in Fig. 3 and locked in Fig. 4, and also that the spring 24 which is obviously adjustable, tends to urge the brake into locking position. When a loaded belt is traveling in a clockwise direction, as in Fig. 3, it tends to swing the rocker 18, through the media of the surfaces of the brake band and particularly the right-hand end of the band, toward the left, thus tending to maintain the brake in released position. When, however, the belt comes to a stop the said tendency ceases and thus permits the spring 24 to swing the rocker clockwise to tighten the brake and hence stop the belt against reversing its motion.

Adjustment of the tension of the spring 24 by means of the nut 23 permits of accommodation of the brake to the type of weight of the load being carried by the belt.

Obviously, modifications in form or structure may be made without departing from the spirit or scope of the invention.

I claim:

In combination with a shaft having a drum thereon having a belt trained thereabout, a brake drum on said shaft having a brake band thereon, the ends of said band having connector members thereon, a base mounted below said brake drum and having an approximately upright rocker pivoted at its lower end to said base, one of said connectors being pivoted to said rocker near the upper end of the rocker, the other of said connectors being pivoted to said rocker approximately intermediate the said upper end of the rocker and the longitudinal mid-point thereof, a rigid upright spaced from said base and having a horizontal opening therethrough, a substantially horizontal rod having one end slidably mounted in said opening and having the other end pivoted to said rocker at a point approximately intermediate the length of the rocker, and resilient means normally urging said rod farther through said opening and hence normally urging said brake band into locking position on the brake drum, said rod having a collar thereon between said rocker and said upright, said resilient means comprising a coiled tension spring on said rod between said collar and said upright, said one end of said rod being threaded and having a nut thereon adapted to vary the tension of said spring.

References Cited in the file of this patent
UNITED STATES PATENTS

| | | |
|---|---|---|
| 1,109,382 | Wern | Sept. 1, 1914 |
| 1,715,003 | Hale | May 28, 1929 |
| 1,912,645 | Le Tourneau | June 6, 1933 |
| 2,175,381 | Dow | Oct. 10, 1939 |
| 2,328,817 | Le Tourneau | Sept. 7, 1943 |
| 2,505,543 | Havir | Apr. 25, 1950 |

FOREIGN PATENTS

| | | |
|---|---|---|
| 21,057 | Great Britain | 1893 |